Dec. 1, 1959 — M. V. FRIEDELL — 2,915,605
LIQUID LEVEL RESPONSIVE DEVICE
Filed Sept. 19, 1956 — 2 Sheets-Sheet 2
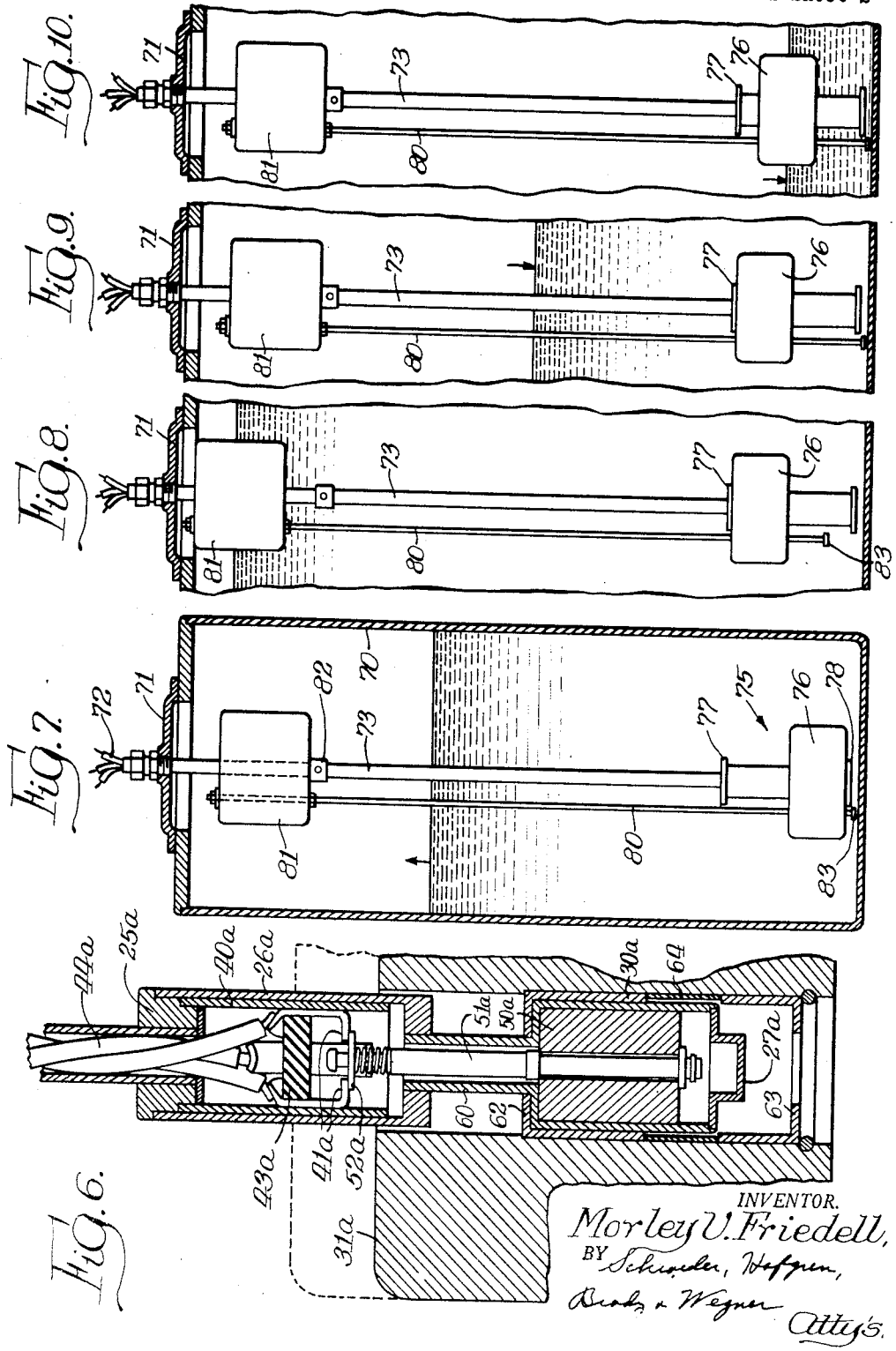
INVENTOR.
Morley V. Friedell,
BY Schroeder, Hofgren,
Brady & Wegner
Attys.

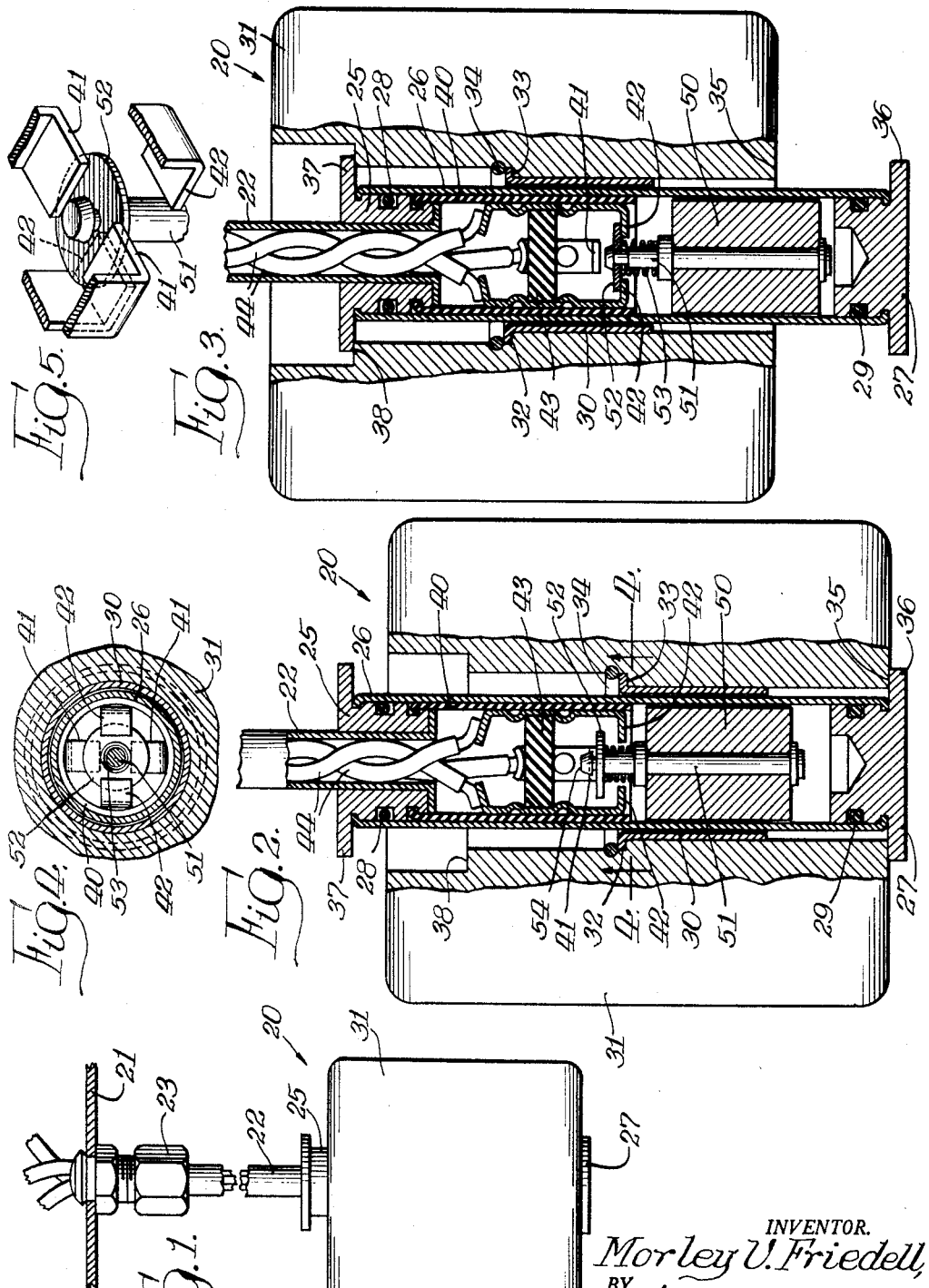

United States Patent Office 2,915,605
Patented Dec. 1, 1959

2,915,605

LIQUID LEVEL RESPONSIVE DEVICE

Morley V. Friedell, Wheatridge, Colo., assignor to C. A. Norgren Company, a corporation of Colorado Application September 19, 1956, Serial No. 610,773

6 Claims. (Cl. 200—84)

This invention relates to a control and more particularly to a control device which is responsive to the level of liquid in a container.

It is the general object of the present invention to produce a new and improved control of the character described.

It is a more specific object of the present invention to produce a control device for creating a signal in response to changes of liquid level in a container.

One of the features of the present invention is the provision of a float mounted to be moved by changes in the level of liquid in a container and arranged so that movement of the float serves to operate a signalling means with the arrangement being such that the entire device can be immersed in the liquid in the container. Thus there is provided a device which is adaptable to use in many instances where the mounting of a conventional float operated switch would be difficult, if not impossible.

A further feature of the present invention is the utilization, in a device of the type described in the preceding paragraphs, of unique contact and switching arrangements which permit the use of contacts of high current carrying capacity which are arranged to provide a quick make and break action.

A further feature of the present invention is its adaptability to installation in containers of various shapes and sizes and, according to the present invention, a liquid level operated control can be provided which can operate through wide ranges of rise and fall of a liquid.

Other and further features and advantages of the invention will be readily apparent from the following description and drawings in which:

Fig. 1 is a side elevational view showing the device of the present invention mounted within a container, Fig. 2 is an enlarged view, partly in vertical section, showing the interior construction of the device of Fig. 1, Fig. 3 is a view like Fig. 2, but showing the float in upper position, Fig. 4 is a horizontal sectional view along line 4—4 of Fig. 2, Fig. 5 is an enlarged perspective view showing the switch contacts and contactor, Fig. 6 is a view similar to Fig. 2, but showing a modified form of construction, Fig. 7 is a vertical sectional view through a container in which a further modification of the present invention is utilized, showing the floats in one position, Fig. 8 is a view like Fig. 7 showing the floats in a second position, Fig. 9 is a view like Fig. 7 showing the floats in a third position, and Fig. 10 is a view like Fig. 7 showing the floats in a fourth position.

While the invention herein disclosed is shown in several embodiments, it is not intended to limit the invention to the specific forms and arrangements shown, it being contemplated that various changes may be made by those skilled in the art, without departing from the spirit and scope of the invention as pointed out in the appended claims.

Referring now to Fig. 1 of the drawings, the liquid level responsive device of the present invention, is indicated generally at 20 and is supported within a container 21 by means of a conduit 22. The upper end of the conduit 22 is provided with a fluid-tight connection to the top of the container 21 by a simple fitting including a packing nut 23. The lower end of the conduit is secured by means of a bushing 25 to a liquid-tight casing in the form of a tube 26. The tube 26 is constructed of non-magnetic material, such as brass or plastic, and is closed at its lower end by a plug 27, also of non-magnetic material. Sealing rings 28 and 29 assure a liquid-tight contact between the tube 26 and the bushing and plug and a liquid-tight fit between the conduit 22 and bushing 25 may be assured by applying solder to the joint.

Slidably mounted on the exterior surface of the tube 26 is a first magnetic member in the form of a sleeve 30 made of magnetic material such as mild steel or the like. The sleeve 30 is secured to and carried by a hollow float 31, the sleeve being provided with an outturned flange 32 held against a shoulder 33 formed in the hollow of the float by a retaining ring 34.

The float 31 may be made of molded cellular material such as styrene or may be a hollow metal float. The float 31 is mounted so as to be movable vertically with changes in the level of the liquid in the container from a first position, wherein the bottom 35 of the float rests upon a collar 36 formed on the plug 27, to an upper position, wherein a collar 37 formed on the bushing 25 engages a shoulder 38 formed in the hollow of the float.

Mounted within the tube 26, and thus sealed from the liquid in the container, is a cylinder 40 of insulating material which serves to support two pair of vertically spaced contacts 41 and 42. The electrical contacts 41 and 42 are held in proper alignment by means of suitable grooves formed in the side walls of an insulating block 43 held within the cylinder 40. Wires 44 are connected to the pairs of contacts and extend outwardly through the conduit 32 to connect to a suitable electrical circuit.

Within the tube 26 and below the contacts 41 and 42, is a second magnetic member in the form of a permanent magnet 50 of Alnico, or the like. A nylon rod 51 is carried by the magnet 50 and, in turn, carries at its upper end a contactor disk or washer 52 made of electrically conducting material and operable electrically to connect together either the pair of contacts 41 or the pair 42.

It will be noted by referring to Fig. 2, that with the float resting on the stop provided by the collar 36, the sleeve 30 is positioned some distance above the bottom of tube 26, with this spacing being so arranged as to cause the magnet 50 to move upwardly within the tube to the position illustrated. In this position, the contactor disk 52 is in electrical contact with the upper pair of contacts 41. Such contact, of course, prevents further upward movement of the magnet 50, although the attraction between the magnet 50 and the sleeve 30 is such as to urge the magnet to a position centrally within the sleeve.

As the liquid level within the container rises, the float 31 is buoyed upwardly thereby. Slight movement of the float upwardly serves to increase the magnetic attraction acting between the sleeve 30 and the magnet 50 and this attraction not only holds the magnet up, but also holds the sleeve (and hence the float) down. As the liquid level continues to rise, the buoyant force on the float increases and the float is moved upwardly slowly against the increasing magnetic attraction between the sleeve and magnet until the point of maximum attraction is passed. This initial movement of the float is approximately one-fourth of the total up and down movement permitted the float. When the float moves beyond the point of maximum magnetic attraction, the magnetic force decreases rapidly and as a result, at the instant the point of maximum attraction is passed, the float 31 moves upwardly to the position shown in Fig. 3. Such movement of the float, of course, moves the sleeve 30 to the position illustrated and releases the magnet 50 from the attraction therebetween. Gravity thereupon drops the magnet to the position illustrated in Fig. 3 wherein the contactor 52 rests upon the contacts 42.

The reverse occurs as the liquid level gradually lowers. In the position of Fig. 3, the float is supporting only its own weight, plus that of the sleeve 30. As the liquid level falls, the float drops and the sleeve 30 is moved into the field of the magnet 50. As the magnetic attraction begins to be exerted, the pull is downward on the float, moving the sleeve closer to the magnet 50, thereby further increasing the attraction. As a result, the float 31 is pulled downwardly against the stop 36 and the magnet 50 moved to the position shown in Fig. 2. Because of the tendency of the magnet 50 to strike the upper contacts 41 with some force, the contactor disk 52 is but loosely carried on the rod 51 and a damper spring 53 is provided to urge the disk against an enlarged head 54 on the upper end of the rod. The provision of the foregoing eliminates any tendency of the magnet to bounce and thus, contact once made is maintained without danger of arcing.

It will be noted from the foregoing description that the conduit 22 serves principally as a means for forming a passage for the wires 44 to isolate them from contact with the liquid in the container. The conduit may also serve as a support for the device 20, although obviously other forms of support may be used. Even though the conduit 22 is utilized to provide the support for the device, there is no need that the conduit be straight or that it extend vertically upwardly from the device. In addition, the entire electrical portion of the device is sealed within the casing formed by the tube 26 and no rods, chains, levers, or other mechanical devices extending through to the exterior of the container are necessary.

A somewhat modified form of construction is shown in Fig. 6 where parts similar to those already described are given identical reference numbers with the suffix *a* added. Thus, the device includes a float 31a carrying a sleeve 30a surrounding a magnet 50a which, in turn, carries a rod 51a and a contactor 52a mounted in its upper end. The tube 26a is provided with a reduced portion 60 and is closed at its lower end by a cap 27a. The sleeve 30a is divided into upper and lower portions by a spacer sleeve 64 of non-magnetic material, the sleeve 30a having an inturned flange 62 at its top and a similar flange 63 at its bottom with the flanges acting as pole pieces to increase the magnetic attraction between the sleeve and the magnet. The provision of the pole pieces in the manner illustrated amplifies the magnetic forces and thus increases the contact force between the contactor 52a and the electrical contacts. When the magnet is in its lower position it is urged not only by gravity, but also by magnetic attraction into firmer contact with the lower contacts. As the attraction between the sleeve 30a and magnet 50a is greater, a larger float must be provided so as to have the necessary buoyancy to be able to move the sleeve 30a away from the magnet with changes in liquid level.

In the embodiments of the invention so far described, it will be clear that the float arrangement shown is capable of accommodating minimum differentials between high and low liquid levels although obviously, the device could be used at any position in a container to indicate that the liquid level is either above or below the location of the device.

Where it is desired to have a device capable of giving definite signals when the liquid is at a high level and when the liquid is at a low level and wherein it is expected that larger changes in liquid elevation will occur, the embodiment illustrated in Figs. 7 to 10 may be utilized.

As shown in those figures, the container 70 is relatively high and is closed at its top by a cap 71 through which wires 72 extend into a conduit 73 extending downwardly from top to bottom of the container. Mounted at the lower end of the conduit 73 is a liquid level responsive device 75 similar in all respects to the device illustrated in detail in Figs. 1 to 5 with the exception that the float 76 is smaller and possesses insufficient buoyancy to move its sleeve (similar to the sleeve 30 of Fig. 2) upwardly against the attraction of its magnet (similar to the magnet 50 of Fig. 2). The float 76, however, possesses sufficient buoyancy to support itself and the sleeve against the upper stop 77 when the sleeve and magnet have been separated to the extent illustrated in Fig. 3, wherein the magnetic attraction is substantially zero. A lower stop 78 similar to the collar 36 is provided to support the float in the same manner as the operation of the collar 36 previously described.

In order to provide the required buoyancy, a second float is provided and connected to the first float so that the two floats operating together will be able to move the sleeve away from the magnet and thereby overcome the magnetic attraction therebetween.

For this purpose, a rod 80 is connected at its upper end to a second float 81 slidably mounted on the conduit 73 and arranged, when unsupported by the liquid, to rest upon a stop 82 secured to the conduit. The lower end of the rod extends through a suitable opening in the lower float 76 and is provided with an enlarged head 83 at its bottom which head is larger than the opening through the float.

With the liquid level in the position shown in Fig. 7, the floats occupy the position illustrated with the magnetic elements of the device 75 occupying the position illustrated in Fig. 2. Although the float 76 is completely immersed in the liquid, its buoyancy is insufficient to cause it to move upwardly against the magnetic attraction existing between the sleeve and the magnet. As the liquid level reaches the float 81, its buoyancy becomes effective and the upward force is transmitted to the lower float by the rod 80 and is sufficient to overcome such magnetic attraction. As this attraction is overcome, the float 76 pops up against the stop 77, as illustrated in Fig. 8, inasmuch as the lower float has enough buoyancy to support itself and the attached sleeve.

As the liquid level falls as indicated in Fig. 9, the upper float comes to rest on the stop 82 and the rod moves downwardly through the opening in the lower float 76. That float, however, possessing the buoyancy mentioned previously, remains in the upper position until the liquid level falls to the position in Fig. 10, whereupon the float moves downwardly until it is within the range of magnetic attraction of the magnet. When that occurs the float 76 moves immediately to the position of Fig. 7.

It will, of course, be understood that when the float 76 is in the position of Fig. 7, an electrical circuit is established as indicated in Fig. 2 while when the float 76 is in the positions of Figs. 8 and 9, the electrical situation illustrated in Fig. 3 obtains.

The system shown in Figs. 7 to 10 is one readily adaptable to containers of many heights. It should be clear that it is not essential that the float 81 be positioned vertically above the float 76 so long as means are provided for transmitting the buoyancy of the upper float to the lower one as the liquid nears the top of the container.

I claim:

1. A liquid level responsive device comprising, float means adapted to be positioned in the liquid, a first magnetic member connected to be moved by the float means, a signal operating element, a second magnetic member connected to the signal operating element, one of said members being a permanent magnet and the other being of magnetic material, said second member being movable from a first position to a second position, stop means holding the float means in a position to locate the first member in position to exert sufficient magnetic attraction on the second member to move the second member to said second position, said float means being movable away from the stop means by changes in the level of the liquid to separate the members thereby decreasing the magnetic attraction therebetween, said second member being constantly biased toward said first position and being moved across the space intervening between said first and second positions by said bias in a single, rapid, continuous movement upon decrease in the magnetic attractive force to a value below the force of said bias.

2. A liquid level responsive device comprising float means adapted to be positioned in the liquid, a first magnetic member connected to be moved by the float means, a signal operating element, a second magnetic member connected to the signal operating element, one of said members being a permanent magnet and the other being of magnetic material, said second member being vertically movable from a first position at one elevation to a second position at a higher elevation, stop means positioned to support the float means in a position to locate the first member in position to exert sufficient magnetic attraction on the second member to raise the second member against gravity to said second position, said float means being adapted to be buoyantly urged away from the stop means by rising liquid level to separate the members thereby decreasing the magnetic attraction therebetween, said second member being constantly biased by gravity toward said first position and being moved across the space intervening between said first and second positions by said gravity bias in a single, rapid, continuous movement upon decrease in the magnetic attractive force to a value below the force of said gravity bias.

3. A liquid level responsive device comprising, a liquid tight casing adapted to be immersed in the liquid, a float movably mounted on the exterior of the casing, a first magnetic member carried by the float, an electrical switch within the casing, a switch operating element within the casing and movable to operate the switch, a second magnetic member within the casing and carrying the switch operating element, one of said members being a permanent magnet and the other being of magnetic material, said second member being vertically movable from a first position at one elevation to a second position at a higher elevation, stop means positioned to support the float in a position to locate the first member in position to exert sufficient magnetic attraction on the second member to raise the second member against gravity to said second position, said float being adapted to be buoyantly urged away from the stop means by rising liquid level to separate the members thereby decreasing the magnetic attraction therebetween, said second member being constantly biased by gravity toward said first position and being moved across the space intervening between said first and second positions by said gravity bias in a single, rapid, continuous movement upon decrease in the magnetic attractive force to a value below the force of said gravity bias.

4. A liquid level responsive device comprising, a liquid tight casing adapted to be immersed in the liquid, a float movably mounted on the exterior of the casing, a sleeve of magnetic material surrounding the casing and carried by the float, an electrical switch within the casing, a switch operating element within the casing and movable to operate the switch, a permanent magnet within the casing and carrying the switch operating element, said magnet being vertically movable from a first position at one elevation to a second position at a higher elevation, a stop on the casing positioned to support the float in a position wherein the sleeve is located to exert sufficient magnetic attraction on the magnet to raise the magnet to said second position, said float being adapted to be buoyantly raised away from the stop by a rising liquid level to move the sleeve away from the magnet, said magnet being constantly biased by gravity toward said first position and being moved across the space intervening between said first and second positions by said gravity bias in a single, rapid, continuous movement upon decrease in the magnetic attractive force to a value below the force of said gravity bias.

5. A liquid level responsive device comprising, a liquid tight casing adapted to be immersed in the liquid, a float movably mounted on the exterior of the casing, a sleeve of magnetic material surrounding the casing and carried by the float, two vertically spaced pairs of electrical contacts within the casing, an electrical contactor within the casing intermediate said pairs of contacts, a permanent magnet within the casing and carrying the contactor, said magnet being vertically movable from a first position wherein the contactor electrically connects the first pair of contacts to a second position wherein the contactor electrically connects the second pair of contacts, a liquid tight conduit for supporting the casing in the liquid, means in the conduit for connecting said pairs of contacts in an electrical circuit, a stop in the casing positioned to support the float in a position wherein the sleeve is located to exert sufficient magnetic attraction on the magnet to raise the magnet to said second position, said float being adapted to be buoyantly raised away from the stop by a rising liquid level to move the sleeve away from the magnet, said magnet being constantly biased by gravity toward said first position and being moved across the space intervening between said first and second positions by said gravity bias in a single, rapid, continuous movement upon decrease in the magnetic attractive force to a value below the force of said gravity bias.

6. The device of claim 5 in which said contactor is mounted on a rod of non-magnetic material secured to the magnet and in which a spring surrounds the rod to cushion the movement of the magnet.

References Cited in the file of this patent

UNITED STATES PATENTS

| | | |
|---|---|---|
| 438,598 | Ashton | Oct. 21, 1890 |
| 573,948 | Wollin | Dec. 29, 1896 |
| 696,280 | Tauber | Mar. 25, 1902 |
| 995,414 | Nault | June 13, 1911 |
| 1,096,470 | Stern | May 12, 1914 |
| 2,084,051 | Van Vulpen et al. | June 15, 1937 |
| 2,142,680 | Shrode | Jan. 3, 1939 |
| 2,180,884 | Silvestri et al. | Nov. 21, 1939 |
| 2,719,485 | Bendar | Oct. 4, 1955 |
| 2,726,296 | Hanson et al. | Dec. 6, 1955 |
| 2,783,326 | Hanson et al. | Feb. 26, 1957 |
| 2,847,528 | Combs | Aug. 12, 1958 |

FOREIGN PATENTS

| | | |
|---|---|---|
| 658,662 | Germany | Mar. 24, 1938 |
| 669,932 | Great Britain | Apr. 9, 1952 |